(12) United States Patent
Egan et al.

(10) Patent No.: US 7,577,676 B2
(45) Date of Patent: Aug. 18, 2009

(54) INTERACTIVE BROADCAST OR INPUT METHOD AND SYSTEM

(75) Inventors: John Egan, London (GB); Ashley Faull, London (GB)

(73) Assignee: Sit-Up Limited, London (GB)

( * ) Notice: Subject to any disclaimer, the term of this patent is extended or adjusted under 35 U.S.C. 154(b) by 354 days.

(21) Appl. No.: 10/490,252

(22) PCT Filed: Oct. 1, 2001

(86) PCT No.: PCT/GB01/04367

§ 371 (c)(1),
(2), (4) Date: Sep. 24, 2004

(87) PCT Pub. No.: WO03/030100

PCT Pub. Date: Apr. 10, 2003

(65) Prior Publication Data

US 2005/0036359 A1    Feb. 17, 2005

(51) Int. Cl.
*G06F 17/00* (2006.01)
(52) U.S. Cl. ............... 707/102; 707/3; 705/1; 705/26
(58) Field of Classification Search ........... 707/1–3; 705/35, 37; 455/415; 379/120
See application file for complete search history.

(56) References Cited

U.S. PATENT DOCUMENTS

| | | | |
|---|---|---|---|
| 4,789,928 A * | 12/1988 | Fujisaki | 705/37 |
| 5,585,858 A | 12/1996 | Harper et al. | |
| 6,016,344 A * | 1/2000 | Katz | 379/260 |
| 6,029,151 A * | 2/2000 | Nikander | 705/39 |
| 6,243,691 B1 * | 6/2001 | Fisher et al. | 705/37 |
| 6,415,270 B1 * | 7/2002 | Rackson et al. | 705/36 R |
| 6,510,417 B1 * | 1/2003 | Woods et al. | 704/275 |
| 7,337,139 B1 * | 2/2008 | Ausubel | 705/37 |
| 7,428,505 B1 * | 9/2008 | Levy et al. | 705/37 |
| 2001/0025306 A1 | 9/2001 | Ninokata et al. | |
| 2002/0046299 A1 * | 4/2002 | Lefeber et al. | 709/318 |
| 2002/0087469 A1 * | 7/2002 | Ganesan et al. | 705/40 |
| 2002/0169716 A1 * | 11/2002 | Johnson et al. | 705/40 |

FOREIGN PATENT DOCUMENTS

| | | |
|---|---|---|
| GB | 2343095 A | 4/2000 |
| GB | 2348346 A | 9/2000 |
| JP | 10254957 | 3/1997 |
| JP | 2001143008 | 11/1999 |

(Continued)

OTHER PUBLICATIONS

Search Rept. (GB420452.5).

(Continued)

*Primary Examiner*—Luke S. Wassum
*Assistant Examiner*—Robert Timblin
(74) *Attorney, Agent, or Firm*—Blakely Sokoloff Taylor & Zafman LLP

(57) ABSTRACT

The invention is generally but not exclusively concerned with problems associated with production of interactive television, particularly an interactive televised auction, where input must be obtained from a plurality of users and broadcast output must be provided based on live user input. However, solutions provided by aspects of the invention are not limited to such a use and may be more generally applied.

22 Claims, 3 Drawing Sheets

FOREIGN PATENT DOCUMENTS

| | | |
|---|---|---|
| JP | 2001265680 | 9/2001 |
| WO | WO 94/01967 | 1/1994 |
| WO | WO 01/33847 A1 | 5/2001 |
| WO | WO02/28082 A1 | 4/2002 |
| WO | WO03/005273 A1 | 1/2003 |

OTHER PUBLICATIONS http://www.sit-up.tv, Nov. 2000.
http://www.bid-up.tv, Nov. 2000.

* cited by examiner

INTERACTIVE BROADCAST OR INPUT METHOD AND SYSTEM

The present patent application is a non-provisional application of International Application No. PCT/GB01/04367, filed Oct. 1, 2001, which is herein incorporated by reference.

The invention is generally but not exclusively concerned with problems associated with production of interactive television, particularly an interactive televised auction, where input must be obtained from a plurality of users and broadcast output must be provided based on live user input. However, solutions provided by aspects of the invention are not limited to such a use and may be more generally applied.

Aspects of the invention are set out in the claims and preferred features are set out in the dependent claims to which reference should be made. Preferred features of each aspect may be applied to other aspects unless otherwise expressly stated.

A first problem associated with providing an event, particularly an interactive event, requiring input from multiple users is that a large number of operators are normally required to record user details and/or a voicemail system having large parallel input capacity for recording user details is required, both of which may be cumbersome and slow for users as well as costly to implement for the event provider.

According to a first aspect, the invention provides a method of processing input data for a plurality of users comprising:

receiving an incoming call from a user;

obtaining a user line identifier of a user line from which the call is received;

searching for the user line identifier in a database of pre-registered users to determine whether the user is pre-registered or previously unregistered;

if the user line identifier is found, obtaining user data for the pre-registered user from the database;

if the user line identifier is not found, storing the user line identifier for subsequent registration of the previously unregistered user;

in the case of either a pre-registered user or a previously unregistered user, accepting further user input;

subsequent to accepting further user input, storing user data in the database for the user if the user was previously unregistered.

With this aspect, users may provide input with minimal delay required for registration at the time of providing input and those who have already registered can be recognised as such. The user line identifier may comprise the Caller Line Identifier (CLI) automatically provided in many telecommunications networks. This may be particularly advantageous in providing input for a live or interactive process, such as bids for a live auction.

The method is preferably operated in conjunction with an interactive process having a live phase interrupted by an event, wherein user data is accepted for pre-registered and previously unregistered users during the live phase and previously unregistered users are registered after the event. This may enable both registered and unregistered users to participate in a live event which would normally require pre-registration.

The further user input may be supplied to an interactive process, for example a bid may be supplied to a live auction. The interactive process may comprise processing said further user input for a plurality of users. In this way, input may be rapidly supplied to a live process which depends at least partially on that input. At least some of the user data, if available, may be supplied to the interactive process. For example, preferably an identifier of a user who has provided further user input is output during the live phase and preferably the identifier is based on the user data if available. Conveniently a user name is displayed.

The method may include identifying at least one selected user following said event and providing contact information for the or each selected user. This may enable a user to be called to obtain registration information (if unregistered) or to confirm registration information (if already registered) or may enable despatch (for example of winnings or goods purchased) to a registered user. In a preferred embodiment, the interactive process is an auction and the further user input comprises a bid. However, in this and other aspects, the event may be another interactive event, such as a betting event and the user input may comprise a bet. The event may comprise the close of an auction and the or each selected user comprises a winning bidder.

The method may comprise receiving user input from another medium, for example the Internet (for example by way of live "chat room", by form submission or by e-mail). Preferably an input time is assigned to each user input. In the case of multiple medium input, preferably the times of user input from the other medium and from calling users are correlated.

Preferably stored user data for pre-registered users is confirmed subsequently. This may include providing a line identifier for a user for an operator to call the user on.

In a preferred embodiment, a plurality of users having a common user line identifier are distinguished based on additional user input data. The additional user input data may comprise a unique PIN number assigned to each of said plurality of users having a common user line identifier. This may enable multiple users sharing a line to participate individually in interactive events (although normally not at the same time in the same event). A PIN number or security code may be requested even if there is only a single user associated with a line or even for unregistered users to confirm identity.

User identification may be requested prior to accepting further user input if no user line identifier is received. This may enable users on networks that do not supply line information or who have withheld the information to participate, albeit by supplying identity information in advance. Although in the main aspect the user line identifier is preferably obtained automatically (i.e. without user intervention) from the calling network, it is possible simply to request a user to supply the telephone number manually where the line identifier is not available. However, the use of a CLI is greatly preferred as it effectively provides a reasonable level of security; if manual identification is obtained, this is preferably supplemented by a higher level of security check, for example requiring a credit card number of a user.

User data may be retrieved based on the CLI, for example by using a reverse directory lookup, if available. The user data may be supplemented or confirmed in a subsequent registration process.

The method may include despatching goods or services to a user who has registered. In the case of a pre-registered user, the goods may be despatched on receipt of a PIN number (either at the time of supplying the further user data or subsequently) without requiring further user verification; this may greatly facilitate a transaction.

Although the call will normally be a voice call, references to call herein may include other communication (such as SMS messages) where information and a user line identifier may be communicated together.

This feature may be independently provided in a method of processing a transaction via a telecommunications network comprising:

receiving a user line identifier for a user communication line;

looking up user data based on the received user line identifier provided by the telecommunications network;

verifying a security code provided by the user based on the stored data;

performing a transaction based on the user line identifier and verified security code.

The transaction is preferably performed without further verification of user identity. The transaction may be based on an instruction received from the user and may comprise dispatch of an item bid for or ordered or won.

In a second aspect or preferred implementation, the invention provides a method of providing an interactive auction in which bids are received by a plurality of calling users, the method comprising identifying bidders based on a line identity of a line from which a call is received, storing user information for previously identified users based on line identities, accepting bids from users whether or not the line identity corresponds to a previously identified user and obtaining further user information after the auction for at least one user who was not previously identified.

In a preferred implementation, calling bidders are notified during calling whether a bid is initially accepted or rejected. The method may further comprise notifying a caller that he or she has been outbid during the call. At least some audio provided to a caller corresponds to audio of an interactive programme for which user input is obtained (this may be particularly beneficial in conjunction with the third or fourth aspect). The notification may be by SMS and the user's "call" may comprise an SMS message rather than a voice call.

In a broad related aspect, the invention provides use of a caller line identifier (CLI) to identify a bidder in an interactive broadcast auction.

A further problem associated particularly but not exclusively with providing an interactive broadcast is that it may be costly and troublesome to provide live media to accompany the event. However, even if many similar events are broadcast, it is not acceptable simply to provide pre-recorded media to accompany user interaction.

A third aspect provides a method of providing a real-time media output comprising:

providing pre-recorded media, the pre-recorded media having at least one live input insertion key point;

identifying the or each live insertion key point;

combining live input with the pre-recorded media at the live insertion key points to provide output media;

outputting the output media.

In this way, a live output can be produced but this can be largely based on pre-recorded media with live input only where required. Preferably there are a plurality of live insertion key points.

The method is particularly beneficial when subsequently providing a further real-time media output by combining at least a part of the pre-recorded media with further live input. This may allow economies to be realised by re-use of recorded media.

The pre-recorded media may comprise video having at least one live video insertion point. Additionally or alternatively, the pre-recorded media may comprise audio containing a pause for insertion of live audio.

In a most preferred embodiment, the pre-recorded media comprises combined video and audio wherein the audio contains a general reference to data on screen, wherein the video has a video insertion point for overlaying live data and wherein said combining comprises overlaying live data on the video. This may allow the best "live" effect to be generated for a viewer without certain technical problems of inserting live audio seamlessly. In one preferred implementation, the video may comprise a plurality of scene types, a first of which is adapted for overlaying of data (e.g. a background or logo or scene having a defined substantially static area) and a second of which is not specifically adapted for overlaying of data (e.g. a shot of a presenter or product), the video switching to the first scene type at an insertion key point. Additionally or alternatively, the method may include overlaying live data on a specified area of display at an insertion key point.

In a preferred implementation, the real-time media output corresponds to an interactive event, wherein the output media is broadcast, the method comprising accepting user input from viewers as the output media is broadcast and wherein the live input is based on said user input. The live input may comprise an identifier of a viewer. The method is particularly advantageous in the case where the interactive event comprises an auction and wherein the user input comprises bids. The pre-recorded media may comprise (at least in part) a pre-recorded commentary or product description.

Preferably, timing of playback of the pre-recorded media is co-ordinated with an interactive process. For example, acceptance of user input may be coordinated to coincide with a particular playback point (the start or an intermediate key point) of the media. For example, an interactive auction may have start and end points for accepting bids co-ordinated with key points in the media. The method may thus comprise providing an interactive broadcast wherein user interaction is controlled in synchronisation with playback of media.

The method may include inserting live media clips between playback of pre-recorded media. Particularly where a pre-recorded media clip is repeated frequently or a number of similar clips are played out, the provision to insert a "genuine" live media clip may enhance the sensation that the "synthetic" live media created by the method is live.

In a related fourth aspect or preferred implementation, the invention may provide a method of providing a real-time interactive auction based on live viewer input, the method comprising playing out a pre-recorded clip of an auction, the clip including at least one visual or audio reference to a bid, accepting bids from viewers, overlaying real-time data based on accepted bids on the pre-recorded clip.

In a broad related aspect, the invention provides use of a pre-recorded clip having live data insertion points to provide media to accompany an interactive broadcast auction.

The input method of the first or second aspects may be used in conjunction with the third or fourth aspects to advantage to provide an enhanced response interactive broadcast.

In a fifth method aspect, the invention provides a method of creating a pre-recorded clip to accompany an interactive broadcast, the method comprising:

recording a media clip;

designating at least one area on a video portion of the clip or at least one period of an audio portion of the clip as a live media insertion point;

storing the clip;

storing information identifying the or each live media insertion point.

Preferably the clip comprises both audio and video and at least one live media insertion point is designated which comprises an area of video on which live data can be overlaid and wherein the audio contains a generic reference to the data. In a preferred implementation, the clip comprises media to accompany an auction, the video having a display area for displaying a latest or maximum bid and the audio containing a reference to a latest or maximum bid.

In a sixth method aspect, the invention provides a method of providing a media clip to accompany an interactive auction comprising:

recording a media clip including details of the subject of the auction and commentary, the commentary including reference to bids but not bid amounts;

designating at least one portion for insertion of a live bid and storing information identifying the designated portion.

The invention extends to clips or portions thereof (or data or signals or storage media conveying such clips or portions) provided by or for use in the methods of any of the third to sixth aspects.

In the above aspects (particularly the first and second), the method may include generating a despatch or billing record for a user who has interacted.

A further problem with providing an interactive event such as an auction is that a user who has won may not wish to proceed. Ironically, the benefits of avoiding the need for pre-registration which may be obtained with the first two aspects may exacerbate this.

A seventh method aspect provides a method of processing data for use in an interactive auction comprising:

during the auction:
receiving bids from a plurality of bidders;
storing in a database data including a plurality of identifiers of bidders and a last bid amount for each bidder;
following close of the auction:
identifying at least one winner based on the stored data and at least one predetermined criterion;
seeking confirmation of the or each winner identified;
if confirmation of a winner fails, identifying a replacement winner from among the bidders based on the stored data.

The seventh method aspect may thus alleviate the problems of having insufficient winners, without requiring a re-run of the auction. Confirmation may comprise providing contact details to an operator to seek confirmation or further information or payment details or may (additionally or alternatively) comprise accepting a confirmation instruction received from a bidder.

Preferably, confirmation of the or each replacement winner is also sought. This may be repeated as many times as required to compile a sufficient list of confirmed winners. Alternatively, a threshold or other criterion may be specified to limit selection of replacements, for example to no more than a specified number or proportion of replacements or or number or replacement attempts or minimum bid or confirmation time cut-off.

As generally noted, preferred features of each aspect may be applied to other aspects; for example, the features of order confirmation may be advantageously applied in conjunction with the first and second aspects.

Preferably an ordered winning list comprising a plurality of winners is compiled and a winner is deleted from the list if confirmation fails for that winner. Preferably, winners below a deleted winner (if any) are promoted and a replacement winner is added to the bottom of the list.

Differing bid amounts may be stored for each winner. Each winner is preferably allocated a purchase amount based on the bid amounts. In one embodiment, the purchase amount for each winner corresponds to the respective bid amount for each winner.

However, in other embodiments, the purchase amount may not necessarily correspond to the bid amount by that winner. For example, the purchase amounts for at least two winners may be set to the same amount. In one implementation, particularly a falling price auction, the purchase price for a group of winners is set at the lowest bid in the group. Alternatively, the purchase price for a group of winners may be set at the highest bid in the group. A group of bidders may be given an opportunity to match a winning bid, and if confirmation is not received, a replacement winning bidder may be selected.

In a related broad aspect, the invention provides use of a store of bidders in an interactive broadcast auction to identify a bidder to replace a winner identified in an initial winner identification process.

The invention extends to a computer program or computer program product comprising instructions for performing any of the above methods, as well as to apparatus for carrying out any of the methods. Such apparatus may include a general purpose computer.

The invention further provides a pre-recorded media source having live input insertion key points for use in the method of any of third and fourth aspects and further extends to a programme produced by combining pre-recorded media and live input.

The invention further provides a data structure comprising user data obtained in accordance with any preceding method. In a particular aspect, the invention provides a data structure comprising a user line identifier, user identification data including address details, an auction number and a bid amount.

In a further aspect the invention may provide a method of providing an interactive broadcast auction comprising playing out a pre-recorded clip merged with live interactive data based on bids received from viewers.

In a yet further aspect, the invention may provide a method of providing an interactive broadcast auction comprising accepting bids from callers based on caller line identification without requiring pre-registration of callers.

In a still further aspect, the invention may provide a method of compiling a viewer database comprising collecting caller line identification data for viewers calling in response to a broadcast stimulus. The method may include storing further viewer identification information.

In a further aspect, the invention may provide a method of providing an interactive broadcast auction comprising determining an initial list of winners from stored details of bidders and promoting at least one bidder to the list of winners following close of the auction in the event of withdrawal of a winner from the initial list.

In a further aspect, the invention may provide a method of providing an interactive broadcast auction comprising determining a group of winners each having respective bid amounts and setting a group sale amount for all members of the group which differs from at least one bid amount.

In a further aspect the invention may provide a method of providing an interactive broadcast auction comprising receiving bids from two separate sources, assigning bid times to all bids and processing bids based on the assigned times.

An embodiment of the invention will now be described by way of example only with reference to the accompanying drawings in which.

In the following description, which for ease of understanding relates to an interactive auction, each feature disclosed may be provided independently of other features and outside the context of an auction, with any necessary modifications, unless otherwise expressly stated or clearly implied from the context. For example, the auction process 10 may be replaced by another interactive process which need not necessarily be real-time.

Figure 1:
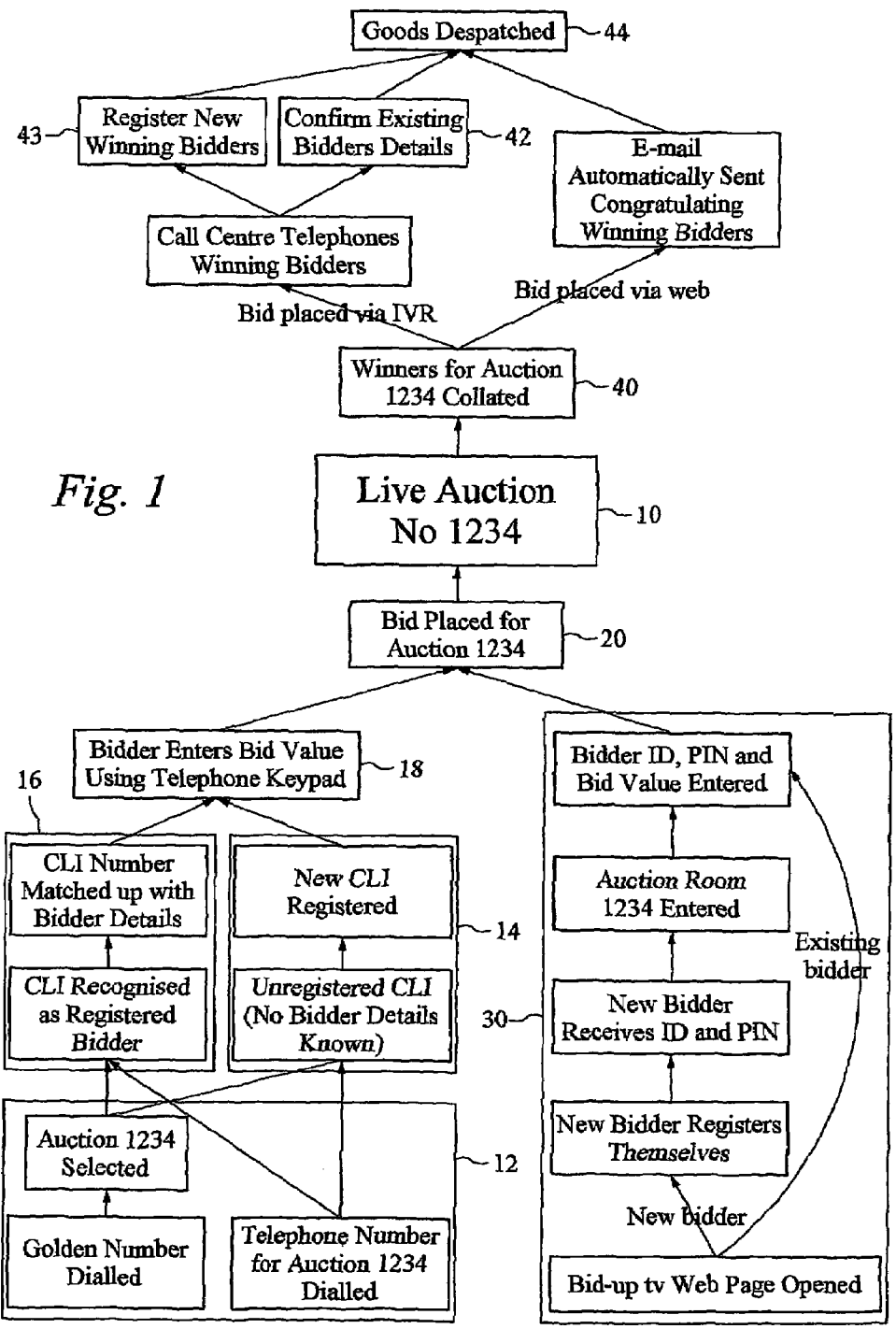
FIG. 1 is a schematic overview of the process of providing an interactive auction.

Referring to FIG. 1, an input process embodying the first and second aspects will now be explained. The input process of this embodiment is described in the context of an auction but may be applied to other processes requiring input from plural users.

An auction process 10 is assigned an identifier (shown for illustration purposes as 1234). As a preferred feature, this identifier is stored in memory and used to allocate bids and relevant information to the correct auction process; this may enable multiple simultaneous or closely sequential auctions to be performed without difficulty. The auction preferably has a single lot but may have multiple lots each assigned lot identifiers. The auction process 10 corresponds to time-synchronised interactive broadcast and input processes.

A user calls an auction bidding number 12 (preferably broadcast as part of the auction process 10) either by dialling a number specific to the auction or by dialling a master number and subsequently selecting the auction. On receipt of the call, the user's CLI (Calling Line Identifier) is received by the auction input processor. If no CLI is delivered, the action taken may be selected by the auction operator, for example the call may be rejected, the user may be transferred to a manual operator (or in some cases to an automated service) for recording user details prior to bidding. However, assuming a CLI is received, the auction processor then looks the CLI up in a database to see if the user is previously registered. If no CLI is registered (branch 14) the CLI is recorded for subsequent registration and the process proceeds to acceptance of a bid (or input of other further user data) in step 18. However, whilst bid acceptance may be possible without registration, in some embodiments, particularly if no auction is in progress, at this point the user may be given an opportunity to pre-register. If the CLI is recognised (branch 16) the user details are retrieved from the database. User data such as a bid is then input (step 18) for example using a DTMF keypad to enter a numerical bid or by voice recognition or response to prompts (which may use conventional input techniques) or optionally by generating a next bid and asking a user to confirm. The bid and an identifier of the user is placed (step 20) and fed into the auction process 10. The user identifier may be displayed in a broadcast and/or on a website—the identifier preferably comprises a user name if registered but otherwise may comprise the CLI or an abbreviated CLI (or may contain some indication of user area, derived from the CLI).

Meanwhile, inputs such as bids may be received from other sources, for example an Internet input process 30. The bid placing step 20 collates bids from different sources and preferably allocates bid times to them to enable bid order and precedence to be ascertained, either in real time or following close of the auction. It will be appreciated that with multiple bids it may not be possible to provide live updates of current bids but that bidding can be consistently analysed following auction close provided a measure of bid timing is stored.

The auction process 10 and bid process 20 may feed back data (for example broadcast audio and an indication of bid acceptance or new bids may be played to callers and bidding information may be provided to web-based users).

The auction process preferably assigns a bid time to each bid based on time of receipt of bids and processes bids based on the time of receipt. The process may include accepting or processing automatic or proxy bids in addition to live bids. The automatic bids may be generated by the same process or processor that controls the auction or by a separate process.

The process may include giving an indication of a bid amount required for a winning bid or to be included in the current list of winning bids (where there is more than one winner, for example if there are a plurality n of items available, the top n bids will each win an item).

Following completion of the auction, the winners are identified (step 40) and action is taken to notify winners of the results (e.g. by e-mail, by calling, by SMS etc, preferably dependent on the manner in which the bid was placed). A list of winners may be made available for example via the Internet. A preferred feature is that a user who placed a bid by telephone may be automatically notified whether or not he or she has won based on recognition of the line identifier when the user calls a given number. If the bid was placed by a registered user, the details may be provided to a call centre to call the user to confirm the bid or alternatively or additionally the bid may be confirmed automatically on receipt of an instruction from the user, for example by calling with a PIN number or payment details. If the user was not registered, the CLI is passed to a call centre for the user to be called and registered (or if the user is still on the line, the user may be transferred to register directly). At idle periods, non-winning users whose CLIs have been registered may be contacted to enable them to pre-register for subsequent auctions. In the case of a web-based bid, confirmation may be for example effected by email. Following confirmation, any goods or prizes may be despatched to the winner(s) (step 44).

An important preferred independent feature will now be described which may be implemented as part of the confirmation process. In the event that a winning user is not confirmed (for example if they are not contacted within a set time period following close of an auction or if they are contacted but decline to proceed or payment is declined), the stored data may be analysed, the non-confirmed user(s) deleted from the winning list and a new winner inserted in the list.

As part of the confirmation and collation process (step 40) a purchase price may be assigned to users which may correspond to bid prices or may not; for example the lowest or highest price of a group of bids may be applied to a group (and users may be invited to confirm they wish to match the highest bid).

The process of compilation of media to accompany a live auction will now be described with reference to FIG. 2; this process may be applied to other media production.

Figure 2A:
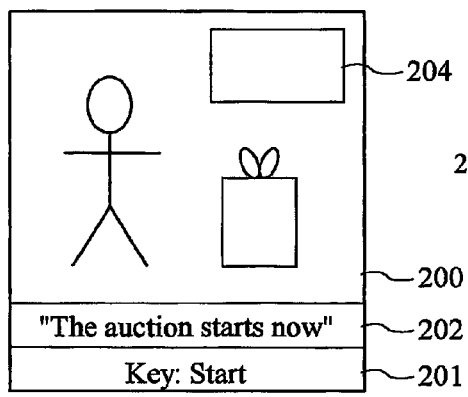
FIG. 2 is a schematic overview of the process of compiling a programme with both live and pre-recorded media in an interactive auction.

Referring to schematic FIG. 2a, a media clip includes a start frame 200 having an associated start key point 201 (preferably stored in association with a digital representation of the clip). As schematically depicted, the audio includes an introductory phrase 202 and the video contains an area 204 for insertion of live data, such start date and time and opening bid price. It will be appreciated that video will be overlaid over a sequence of several frames but only representative frames are schematically shown. Start and end points may be triggered on specified frames but live data may be continuously overlaid and updated asynchronously with the the playback of recorded media, to be overlaid wherever the media allows live insertion.

In the following description, key data may be explicitly stored. However, in a simplified embodiment, keys may be determined from the media content. For example a picture or sound cue or simply the start of a clip may designate the start point and a picture or sound cue (for example the sound of a hammer or designated sound) or caption or simply the end of the clip may designate the end point. The designated video overlay area may be fixed area of the screen.

Live information displayed may advantageously include one or more of the following:—an active telephone number for an auction; a current highest bid; a minimum bid; a number of product items; a description of the product; delivery information.

Figure 2B:
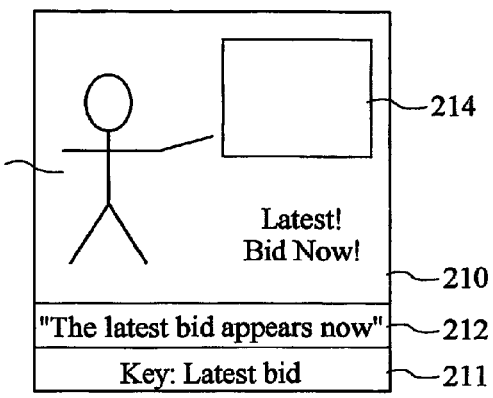

Referring to FIG. 2b, a subsequent scene 210 may have a pre-recorded image area 213 and an area 214 for insertion of live information together with a further live information key 211 and audio 212 referring generally to the live information.

Figure 2C:
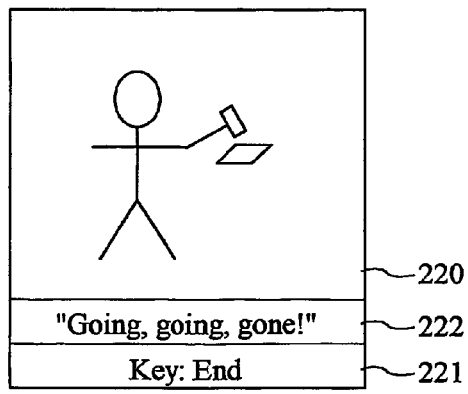

Referring to FIG. 2c, a further scene extract 220 has an associated end key point 221 which triggers closure of the auction together with associated audio 222.

Figure 2D:
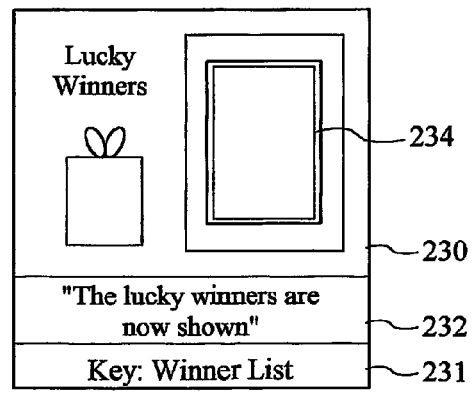

Referring to FIG. 2d, following closure of the auction, a list of winners may be displayed in a designated area 234 of a pre-recorded video clip having suitable audio 232 and a key 231.

For ease of re-configuring and flexibility, the recorded clip may contain integral key signals or key points may be stored in close association with the clip (for example as a computer-readable file or file portion accompanying the recorded media). However, the clip may simply have key points designated (e.g. blank screen areas, audio cues) but the identity of the key points may be stored separately and used by a processor to direct overlay. In such a case, the combination of the media clip and the information identifying the key areas, whether explicitly stored or embedded (e.g. by hard coding) in the control algorithm of the processor may constitute the clip with key points. This may be appropriate if the format of the clip changes little.

Although the embodiment shown overlays video, it is possible to insert audio, for example synthesised audio identification of a bid amount or a live voice of a caller or of a presenter or recording of a voice of a caller based on a live bid. This may be performed in addition to or instead of overlaying video.

Figure 3:
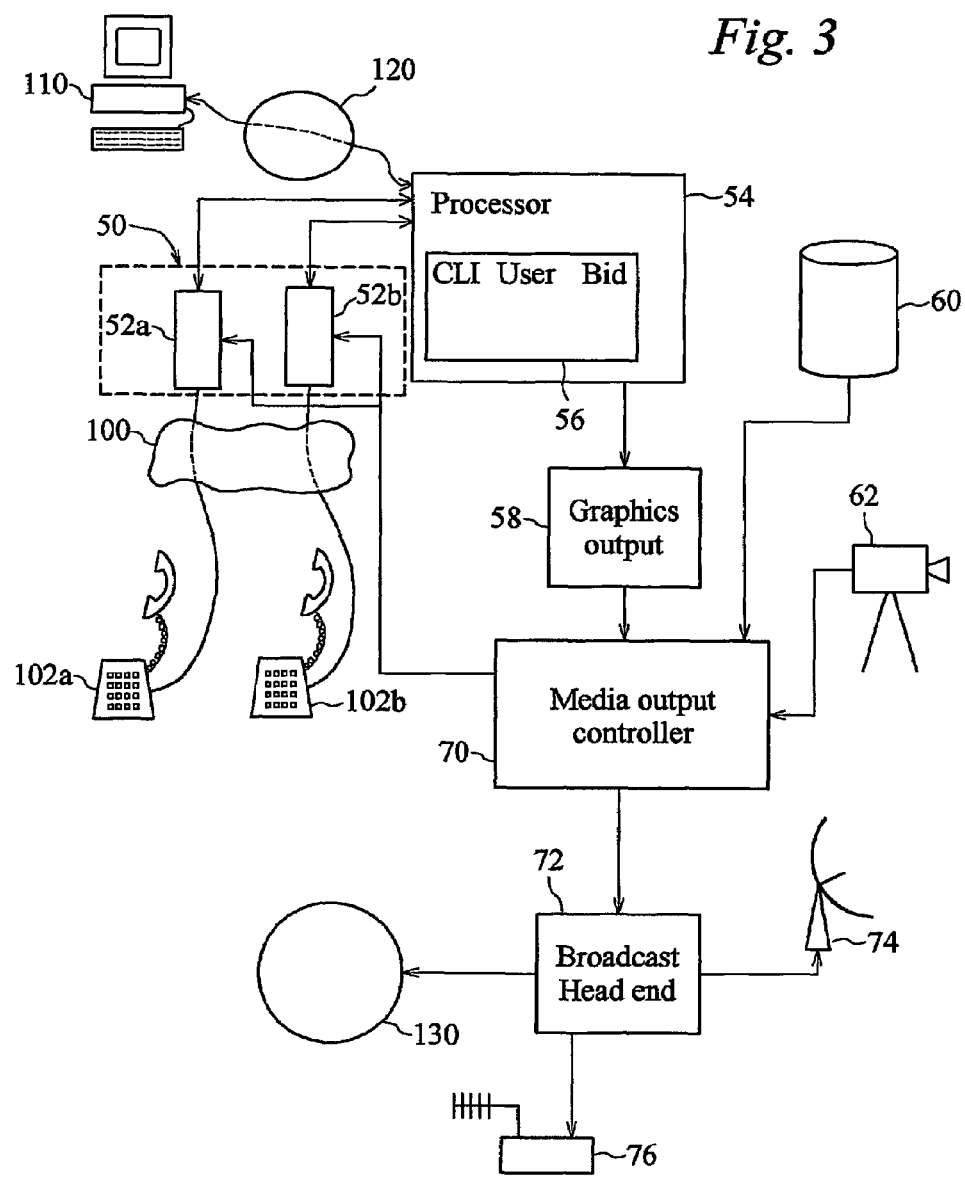
FIG. 3 is a schematic overview of hardware for implementing an embodiment of the invention.

Referring to FIG. 3, a schematic overview of a simplified system embodying the invention will now be described.

A call processing system 50 has a plurality of voice processing inputs 52a, 52b (which may comprise voice modems) for receiving incoming calls from respective user telephones 102a, 102b and for obtaining calling line identifier (CLI) data from a telecommunications network 100. The calls are passed to a processor 54 which has a database 56 storing records of CLI, user details and bid details. The processor also accepts bids via one or more user terminals (for example a Personal Computer) 110 connected via the Internet 120.

The processor manages bids and produces real-time graphics via graphics (and optionally audio) output device 58 to be combined with pre-recorded media from media store 60 and optionally live input from a camera 62 by media output controller 70. This provides a broadcast programme to broadcast head-end 72 which supplies the programme to one or more of satellite uplink 74, cable network 130 and terrestrial transmitter 76. Additionally, the broadcast head-end may supply a webcast over the Internet 120 and/or the processor may supply results data to a connected user interface 110. An important advantageous feature is that the output is preferably not dependent on the distribution format, but comprises a complete programme that can be distributed by a number of networks or media without requiring special technology (for example interactivity in the user equipment). However, it is possible to make use of user equipment, for example to overlay data at the user equipment rather than prior to broadcast, particularly if, for example, MPEG IV or MHEG is used to distribute the programme.

An audio portion of the broadcast may advantageously be supplied to the voice inputs 52a, 52b to be played to callers during bidding.

It will be appreciated that the processor 54 may be distributed among several devices and/or the functions of other components may be integrated with the processor. Components depicted as hardware devices may be embodied in software and vice versa.

Modifications of detail may be made and features may be provided independently of other features or in other combinations unless otherwise stated.

The invention claimed is:

1. A method of processing input data for a plurality of users for an interactive process having a live phase during which the interactive process is arranged to accept a user input from a plurality of users, interrupted by a concluding event, which concludes the live phase of the interactive process, the method comprising:

commencing the live phase of the interactive process;

receiving an incoming call from a user at a call processing system over a calling network;

obtaining from the call processing system a user line identifier of a user line from which the call is received, wherein the user line identifier comprises a caller line identifier obtained from the calling network;

searching for the user line identifier in a database of pre-registered users to determine whether the user is pre-registered or previously unregistered;

if the user line identifier is found, obtaining first user input comprising first user data for the pre-registered user from the database, the first user data comprising user registration data, including user identification data;

if the user line identifier is not found, storing the user line identifier to enable subsequent registration of the previously unregistered user;

in the case of either a pre-registered user, for whom first user data is stored in conjunction with the user line identifier, or a previously unregistered user, for whom no first user data is stored in conjunction with the user line identifier, accepting further user input;

processing the further user input associated with either first user data for a pre-registered user or the user line identifier;

storing information based on the further user input in the database, the further user input being stored in association with either the first user data for a pre-registered user or the user line identifier;

concluding the live phase of the interactive process with the concluding event after which no further user input is accepted from the plurality of users for the interactive process;

subsequent to accepting further user input, and following the conclusion of the live phase of the interactive process, determining whether the user is a previously unregistered user for whom no first user data is stored, and, if the user is a previously unregistered user, obtaining first user data from the user and storing the first user data in the database; and associating the first user data with the stored information using the user line identifier to correlate the stored information and the subsequently stored user data.

2. The method of claim 1, wherein the further user input is supplied to the interactive process.

3. The method of claim 2, wherein the interactive process comprises processing said further user input for a plurality of users.

4. The method of claim 1 wherein the first user data obtained for a pre-registered user is supplied to the interactive process.

5. The method of claim 1 wherein an identifier of a user who has provided further user input is output during the live phase.

6. The method of claim 5 wherein the identifier is based on the first user data obtained for a pre-registered user.

7. The method of claim 6 wherein a user name is displayed.

8. The method of claim 1 further comprising selecting at least one user following said concluding event and providing contact information for the at least one selected user.

9. The method of claim 1 wherein the interactive process is an auction and the further user input comprises a bid.

10. The method of claim 9 wherein calling bidders are notified during calling whether a bid is initially accepted or rejected.

11. The method of claim 10 further comprising notifying a caller that he or she has been outbid during the call.

12. The method of claim 1 wherein said concluding event comprises the close of an auction.

13. The method of claim 1 further comprising receiving a further user input from a source external to the call processing system.

14. The method of claim 13 wherein the times of user input from the source external to the call processing system and from calling users are correlated.

15. The method of claim 1 wherein an input time is assigned to each user input.

16. The method of claim 1 wherein stored first user data for pre-registered users is confirmed by contacting the user using the user line identifier following the conclusion of the live phase of the interactive process.

17. The method of claim 1 wherein a plurality of users having a common user line identifier are distinguished based on additional user input data.

18. The method of claim 17 wherein the additional user input data comprises a unique PIN number assigned to each of said plurality of users having a common user line identifier.

19. The method of claim 1 wherein user identification is requested prior to accepting further user input if no user line identifier is received.

20. The method of claim 1, further comprising generating a dispatch or billing record for a user.

21. The method of claim 1 wherein at least some audio provided to a caller corresponds to audio of an interactive program for which user input is obtained.

22. A computer-readable storage medium storing computer instructions which when executed by a computer, cause the computer to perform a method of processing input data for a plurality of users for an interactive process having a live phase during which the process is arranged to accept user input from a plurality of users, interrupted by a concluding event, which concludes the live phase of the interactive process, the method comprising:

commencing the live phase of the interactive process;

receiving an incoming call from a user at a call processing system over a calling network;

obtaining from the call processing system a user line identifier of a user line from which the call is received, wherein the user line identifier comprises a caller line identifier obtained from the calling network;

searching for the user line identifier in a database of pre-registered users to determine whether the user is pre-registered or previously unregistered;

if the user line identifier is found, obtaining first user input comprising first user data for the pre-registered user from the database, the first user data comprising user registration data, including user identification data;

if the user line identifier is not found, storing the user line identifier to enable subsequent registration of the previously unregistered user;

in the case of either a pre-registered user, for whom first user data is stored in conjunction with the user line identifier, or a previously unregistered user, for whom no first user data is stored in conjunction with the user line identifier, accepting further user input;

processing the further user input associated with either first user data for a pre-registered user or the user line identifier;

storing information based on the further user input in the database, the further user input being stored in association with either the first user data for a pre-registered user or the user line identifier;

concluding the live phase of the interactive process with the concluding event after which no further user input is accepted from the plurality of users for the interactive process;

subsequent to accepting further user input, and following the conclusion of the live phase of the interactive process, determining whether the user is a previously unregistered user for whom no first user data is stored, and, if the user is a previously unregistered user, obtaining first user data from the user and storing the first user data in the database; and associating the first user data with the stored information using the user line identifier to correlate the stored information and the subsequently stored user data.

\* \* \* \* \*